(12) United States Patent
Iori et al.

(10) Patent No.: US 6,905,208 B2
(45) Date of Patent: Jun. 14, 2005

(54) LENSES HAVING CHROMATIC EFFECT

(75) Inventors: Giuseppe Iori, Reggio Emilia (IT); Graziano Marusi, Parma (IT); Gian Giuseppe Giani, Parma (IT)

(73) Assignee: Intercast Europe S.p.A., Parma (IT)

( * ) Notice: Subject to any disclaimer, the term of this patent is extended or adjusted under 35 U.S.C. 154(b) by 0 days.

(21) Appl. No.: 10/880,789

(22) Filed: Jun. 30, 2004

(65) Prior Publication Data

US 2004/0252273 A1 Dec. 16, 2004

Related U.S. Application Data

(62) Division of application No. 10/043,504, filed on Jan. 10, 2002, now Pat. No. 6,814,440.

(51) Int. Cl.⁷ ................................................. G02C 7/02
(52) U.S. Cl. ...................... 351/166; 351/163; 351/177; 351/44
(58) Field of Search ............................ 351/44–45, 159, 351/163, 165–166, 177; 428/411.11

(56) References Cited

U.S. PATENT DOCUMENTS

| | | | |
|---|---|---|---|
| 5,190,896 A | 3/1993 | Pucilowski et al. | 501/64 |
| 5,574,517 A | 11/1996 | Pang et al. | 351/44 |
| 5,668,618 A * | 9/1997 | Simioni | 351/44 |
| 5,694,240 A | 12/1997 | Sternbergh | 359/359 |
| 5,729,323 A | 3/1998 | Arden et al. | 351/163 |
| 5,822,356 A | 10/1998 | Jewell | 372/98 |
| 6,355,694 B1 * | 3/2002 | Suzuki et al. | 516/90 |
| 6,709,720 B2 * | 3/2004 | Hayakawa et al. | 427/555 |
| 2003/0137772 A1 | 7/2003 | Challener | 360/131 |
| 2003/0190126 A1 | 10/2003 | Toyoshima et al. | 385/120 |

* cited by examiner

Primary Examiner—Jordan M. Schwartz
Assistant Examiner—Jessica Stultz
(74) Attorney, Agent, or Firm—Stroock & Stroock & Lavan LLP

(57) ABSTRACT

A lens is provided comprising a substrate, a first metal layer comprising a first metal material uniformly covering an outer surface of said substrate, a first dielectric layer comprising a first dielectric material uniformly covering said first metal layer, a second metal layer comprising a second metal material gradiently covering only a portion of said first dielectric layer and a second dielectric layer formed of a second dielectric material gradiently covering said second metal layer.

6 Claims, 4 Drawing Sheets

LENSES HAVING CHROMATIC EFFECT

RELATED U.S. PATENT APPLICATIONS

The present application is a divisional application of U.S. patent application Ser. No. 10/043,504, filed on Jan. 10, 2002, now U.S. Pat. No. 6,814,440 which is incorporated herein by reference in its entirety.

FIELD OF THE INVENTION

The present invention relates to lenses having a dual chromatic effect when viewed from the side opposed to the wearer.

BACKGROUND OF THE INVENTION

The present invention relates to lenses, and, in particular, to lenses for use in sunglasses, which are externally treated in such a way to produce a new dual chromatic effect when viewed from the side opposed to the wearer. In particular, the present invention is directed at lenses that, when viewed from the side opposed to the wearer, reflect light in two different colors, one of which is reflected in a gradient manner.

In the prior art, chromatic effects have been generally achieved on lenses by depositing interference film on the outer surface of the lens. By choosing a film thickness properly, one can get a wide spectrum of reflected colors.

A common way to obtain a reflected color on the outer surface of a sunglass lens is to uniformly deposit a stack of dielectric films with alternative high and low refraction indexes. Such lenses are described in U.S. Pat. No. 3,679,291, which is hereby incorporated by reference.

Other chromatic lenses and methods for achieving the same are described in U.S. Pat. No. 4,160,584, which is hereby incorporated by reference. In one method, a uniform metallic layer is deposited over a substrate, and then a uniform dielectric material is deposited over the entire metallic layer. As described in U.S. Pat. No. 4,160,584, by depositing a thin transparent layer of a dielectric material on a thin transparent layer of metal, the light partially reflected changes its wavelength composition moving from the white light to a colored light of the spectrum depending on the thickness of the dielectric layer.

In a second method, also disclosed in U.S. Pat. No. 4,160,584, the metallic layer is gradiently deposited over the entire substrate and is then uniformly and entirely covered by a dielectric layer. In this case the outer surface will appear with a gradient colored reflection at the top becoming completely clear at the bottom.

In each of the two methods described above, the resultant lens produces a single, or single-gradient chromatic effect. That is, while colored, each of the lenses are of a single color. Various different materials for use in the metallic and dielectric layers, and the different colors that can be achieved, are described in U.S. Pat. No. 5,054,902, which is incorporated herein by reference.

The present invention is directed at providing a lens having a dual chromatic effect by utilizing at least one layer deposited in a gradient manner. The present invention is also directed at methods of manufacturing such lenses.

SUMMARY OF THE INVENTION

The present invention is directed to lenses, and, in particular, to lenses for use in sunglasses, treated in such a way to produce a new dual chromatic effect. In particular, the present invention is directed towards lenses comprising at least one layer deposited in a gradient manner, such that the lens has at least two zones with differently colored reflection. Even more particularly, the present invention is directed towards lenses comprising at least one layer deposited in a gradient manner, such that the lens has at least two zones with differently colored reflection, one of which is gradiently reflective.

In one aspect of the present invention, the lens comprises at least four layers including a substrate, a first dielectric layer comprising a high index dielectric material uniformly covering an outer surface of the substrate, a second dielectric layer comprising a first low index dielectric material uniformly covering the first dielectric layer, and a third dielectric layer comprising a second low index dielectric material gradiently covering only a portion of the second dielectric layer. The first and second low index dielectric materials can be the same or different materials.

In a second aspect of the present invention, the lens comprises at least four layers including a substrate, a metal layer comprising a metal material uniformly covering an outer surface of the substrate, a first dielectric layer comprising a first dielectric material uniformly covering the metal layer, and a second dielectric layer comprising a second dielectric material gradiently covering only a portion of the first dielectric layer. The first and second dielectric materials can be the same or different materials and can be either high or low index dielectric materials.

In a third aspect of the present invention, the lens comprises at least five layers including a substrate, a first metal layer comprising a first metal material uniformly covering an outer surface of the substrate, a first dielectric layer comprising a first dielectric material uniformly covering the first metal layer, a second metal layer comprising a second metal material gradiently covering only a portion of the first dielectric layer, and a second dielectric layer comprising a second dielectric material gradiently covering the second metal layer. The first and second dielectric materials can be the same or different materials and can be either high or low index dielectric materials, and the first and second metal materials can be the same or different materials.

In a fourth aspect of the present invention, the lens comprises at least five layers including a substrate, a first dielectric layer comprising a first dielectric material uniformly covering an outer surface of the substrate, a second dielectric layer comprising a second dielectric material uniformly covering the first dielectric layer, a metal layer gradiently covering only a portion of the second dielectric layer and a third dielectric layer comprising a third dielectric material gradiently covering the second metal layer. In a preferred embodiment, the first dielectric material is a high index dielectric material and the second and third dielectric materials can be the same or different materials and can be either high or low index dielectric materials.

Such lenses provide at least two zones with differently colored reflection when observed from the side of the lens opposed to the eyes of wearer. In particular, such lenses provide at least two zones with differently colored reflection when observed from the side of the lens opposed to the eyes of wearer, one of which is gradiently reflected.

Other objects and features of the present invention will become apparent from the following detailed description, considered in conjunction with the accompanying drawing figures. It is to be understood, however, that the drawings are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention relates to lenses externally treated with a vacuum deposition technique in such a way to produce a new dual chromatic effect. In particular, the present invention is directed towards lenses comprising at least one layer deposited in a gradient manner, which provides a lens having at least two zones with differently colored reflection. Even more particularly, the present invention is directed towards lenses comprising at least one layer deposited in a gradient manner, which provides a lens having at least two zones with differently colored reflection, one of which is gradiently reflective.

The present invention is not limited to lenses for use in glasses, or sunglass lenses in particular, but rather the term lens as used herein and in the claims shall be interpreted in its broadest sense to include any type of eye-protecting element or device used to protect or shield the eyes of a wearer, such as, for example, lenses, frames, sunglasses, fashion eyewear, sport eyewear, eyeglasses, ophthalmic lenses, visors, shields, face shields, goggles, and the like (as those terms are customarily used in the eyewear industry).

Figure 1:
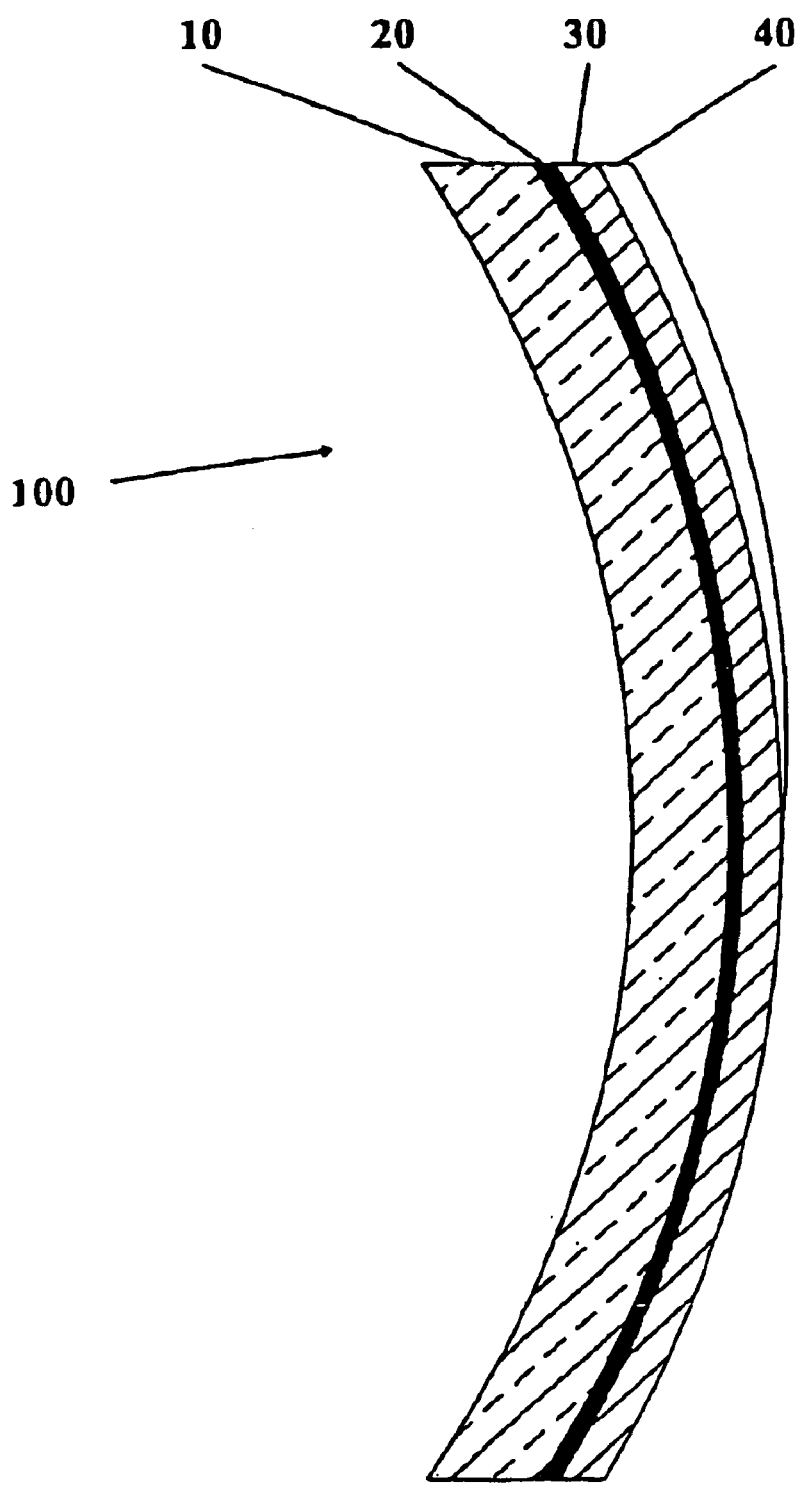
FIG. 1 is a cross sectional view of a lens constructed in accordance with one aspect of the present invention.

In one aspect of the present invention, as seen in FIG. 1, the lens, generally depicted as 100, comprises four layers including a substrate 10, a first dielectric layer 20 comprising a high index dielectric material uniformly covering an outer surface of substrate 10, a second dielectric layer 30 comprising a first low index dielectric material uniformly covering first dielectric layer 20, and a third dielectric layer 40 comprising a second low index dielectric material gradiently covering only a portion of second dielectric layer 30. The first and second low index dielectric materials can be the same or different materials.

In general terms, referring to FIG. 1, a transparent substrate 10 is uniformly coated on an outer surface by vacuum deposition with a first dielectric layer 20. First dielectric layer 20 comprises a high index dielectric material and is deposited in a constant or uniform thickness over an outer surface of substrate 10. Second dielectric layer 30 is then uniformly applied by vacuum deposition on the entire outer surface of first dielectric layer 20. Second dielectric layer 30 comprises a low index dielectric material and is deposited in a constant or uniform thickness over the entire outer surface of first dielectric layer 20. Third dielectric layer 40 is then deposited in a gradient manner over a portion of the outer surface of second dielectric layer 30. Third dielectric layer 40 comprises a low index dielectric material and, in a preferred embodiment, is deposited in a gradient manner so as to be thicker at the top of lens 100 than at the bottom of lens 100. As one of skill in the art will recognize after reading and understanding the present invention, such a lens provides a dual chromatic effect when viewed from the side opposed to the eyes of a wearer, and, in particular, provides for a lens having two zones with differently colored reflection, one of which is gradient in nature.

Figure 2:
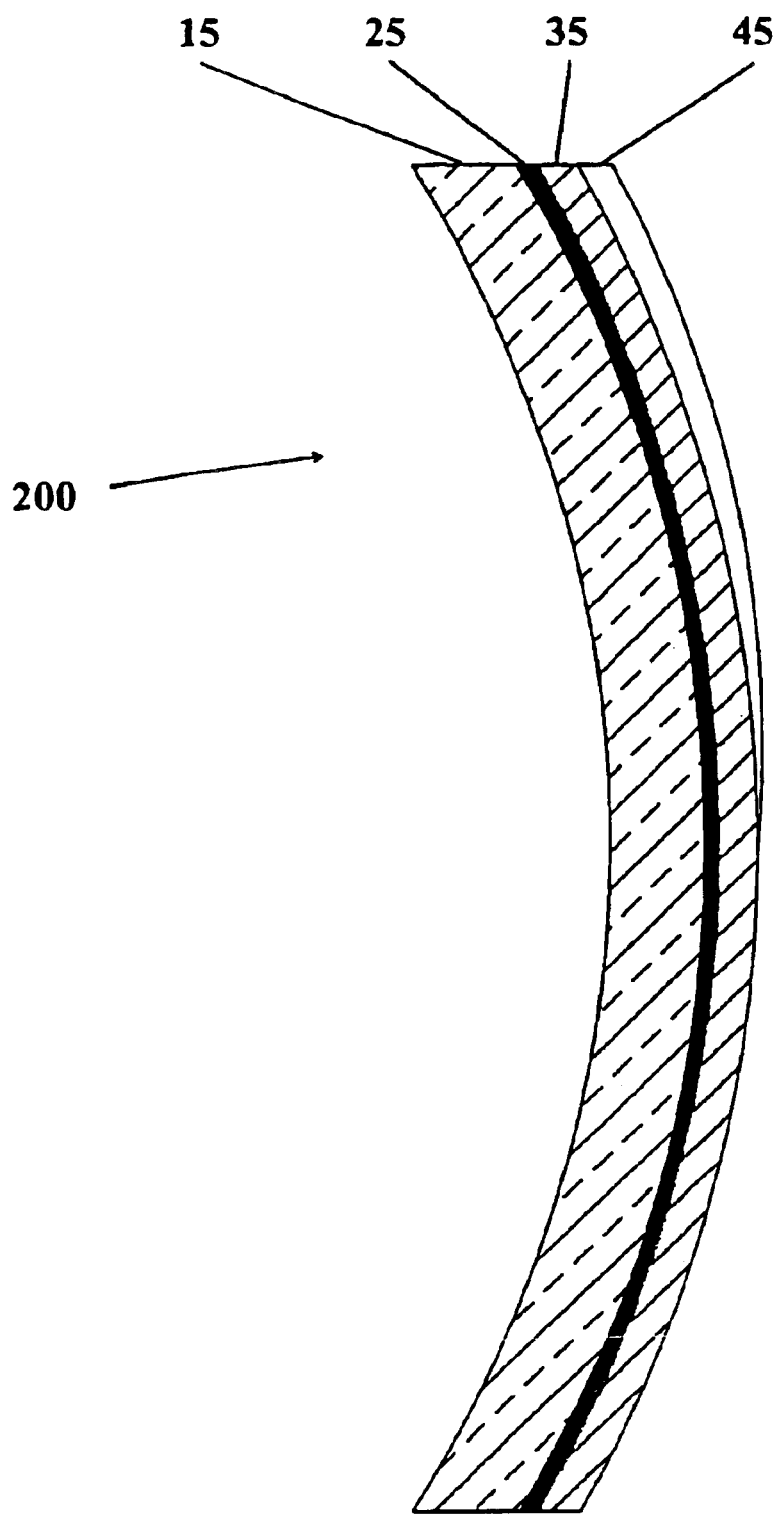
FIG. 2 is a cross sectional view of a lens constructed in accordance with a second aspect of the present invention.

In a second aspect of the present invention, as seen in FIG. 2, the lens, generally depicted as 200, comprises at least four layers including a substrate 15, a metal layer 25 comprising a metal material uniformly covering an outer surface of substrate 15, a first dielectric layer 35 comprising a first dielectric material uniformly covering metal layer 25, and a second dielectric layer 45 comprising a second dielectric material gradiently covering only a portion of first dielectric layer 35. The first and second dielectric materials can be the same or different materials and can be either high or low index dielectric materials.

In general terms, referring to FIG. 2, a transparent substrate 15 is uniformly coated on an outer surface by vacuum deposition with a metal layer 25. Metal layer 25 comprises a metal material and is deposited in a constant or uniform thickness over an outer surface of substrate 15. First dielectric layer 35 is then uniformly applied by vacuum deposition on the entire outer surface of metal layer 25. First dielectric layer 35 comprises a high or low index dielectric material and is deposited in a constant or uniform thickness over the entire outer surface of metal layer 25. Second dielectric layer 45 is then deposited in a gradient manner over a portion of the outer surface of first dielectric layer 35. Second dielectric layer 45 comprises a high or low index dielectric material and, in a preferred embodiment, is deposited in a gradient manner so as to be thicker at the top of lens 200 than at the bottom of lens 200. As one of skill in the art will recognize after reading and understanding the present invention, such a lens provides a dual chromatic effect when viewed from the side opposed to the eyes of a wearer, and, in particular, provides for a lens having two zones with differently colored reflection, one of which is gradient in nature.

Specifically, with regard to FIG. 2, layers 25 and 35 lower the total transmission of the substrate by about 25%. For example, if a 20% transmission sunglass lens is treated one can obtain a violet reflecting lens with a final transmission of 15%. The transmission drop is due to the metallic layer and the change of reflection color is due to the dielectric layer. The final result is that, looking at the external surface of the lens 200, at the top the previous violet reflection shifts into blue leaving the original violet at the bottom. However, looking through the lens internally, the transmission is maintained uniformly because the added dielectric layer 45 does not change the transmission of lens 200.

Figure 3:
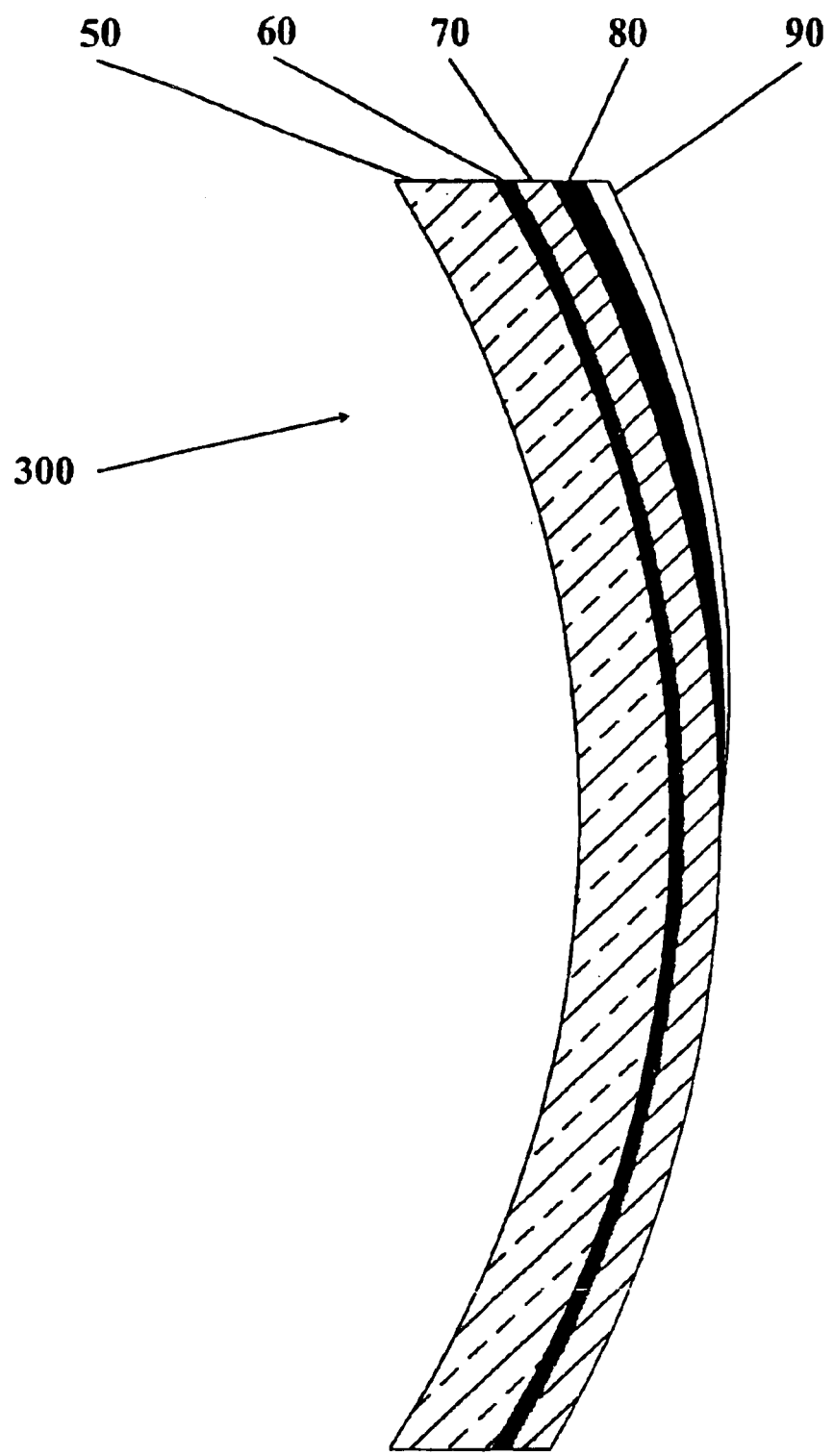
FIG. 3 is a cross sectional view of a lens constructed in accordance with a third aspect of the present invention.

In a third aspect of the present invention, as seen in FIG. 3, the lens, generally depicted as 300, comprises at least five layers including a substrate 50, a first metal layer 60 comprising a first metal material uniformly covering an outer surface of substrate 50, a first dielectric layer 70 comprising a first dielectric material uniformly covering first metal layer 60, a second metal layer 80 comprising a second metal material gradiently covering only a portion of first dielectric layer 70, and a second dielectric layer 90 comprising a second dielectric material gradiently covering second metal layer 80. The first and second dielectric materials can be the same or different materials and can be either high or low index dielectric materials, and the first and second metal materials can be the same or different materials.

In general terms, referring to FIG. 3, a transparent substrate 50 is uniformly coated on an outer surface by vacuum deposition with a first metal layer 60. Metal layer 60 comprises a first metal material and is deposited in a constant or uniform thickness over an outer surface of substrate 50. First dielectric layer 70 is then uniformly applied by vacuum deposition on the entire outer surface of metal layer 60. First dielectric layer 70 comprises a high or low index dielectric material and is deposited in a constant or uniform thickness over the entire outer surface of metal layer 60. Second metal layer 80 is then deposited in a gradient manner over a portion of the outer surface of first dielectric layer 70. Second metal layer 80 comprises a second metal material and, in a preferred embodiment, is deposited in a gradient manner so as to be thicker at the top of lens 300 than at the bottom of lens 300. Second dielectric layer 90 is then deposited in a gradient manner over an entire outer surface of second metal layer 80. Second dielectric layer 90 comprises a high or low index dielectric material and, in a preferred embodiment, is deposited in a gradient manner so as to be thicker at the top of lens 300 (and at the top of second metal layer 80) than at the bottom of lens 300 (and at the bottom of second metal layer 80). As one of skill in the art will recognize after reading and understanding the present invention, such a lens provides a dual chromatic effect when viewed from the side opposed to the eyes of a wearer, and, in particular, provides for a lens having two zones with differently colored reflection, one of which is gradient in nature.

Figure 4:
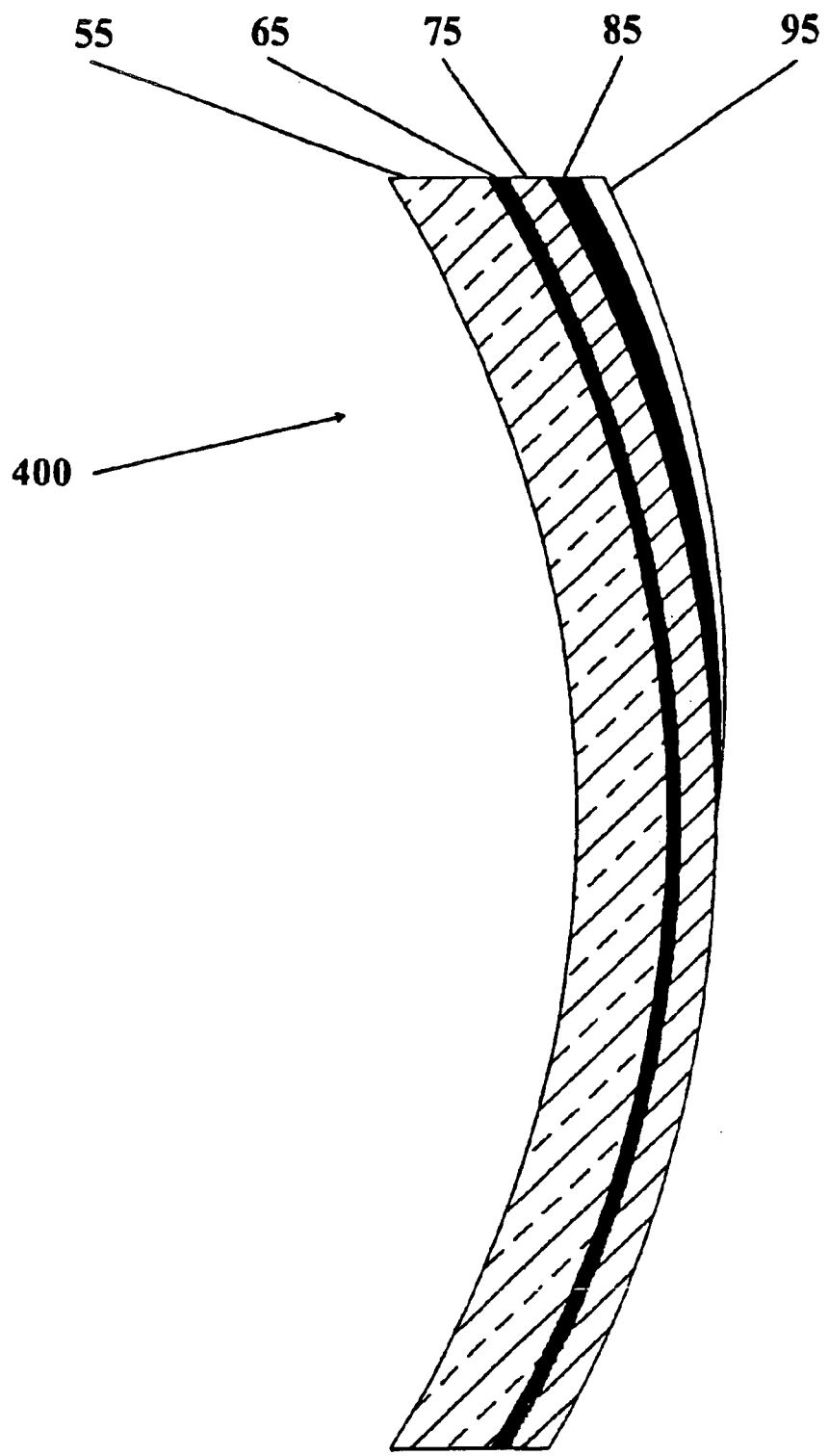
FIG. 4 is a cross sectional view of a lens constructed in accordance with a fourth aspect of the present invention.

In a fourth aspect of the present invention, as seen in FIG. 4, the lens, generally depicted as 400, comprises at least five layers including a substrate 55, a first dielectric layer 65 comprising a first dielectric material uniformly covering an outer surface of substrate 55, a second dielectric layer 75 comprising a second dielectric material uniformly covering first dielectric layer 65, a first metal layer 85 comprising a metal material gradiently covering only a portion of second dielectric layer 75, and a third dielectric layer 95 comprising a third dielectric material gradiently covering metal layer 85. In a preferred embodiment the first dielectric material is a high index dielectric material and the second and third dielectric materials can be the same or different materials and can be either high or low index dielectric materials.

In general terms, referring to FIG. 4, a transparent substrate 55 is uniformly coated on an outer surface by vacuum deposition with a first dielectric layer 65. First dielectric layer 65 comprises a first dielectric material and is deposited in a constant or uniform thickness over an outer surface of substrate 55. In a preferred embodiment, first dielectric material is a high index dielectric material. Second dielectric layer 75 is then uniformly applied by vacuum deposition on the entire outer surface of first dielectric layer 65. Second dielectric layer 75 comprises a high or low index dielectric material and is deposited in a constant or uniform thickness over the entire outer surface of first dielectric layer 65. Metal layer 85 is then deposited in a gradient manner over a portion of the outer surface of second dielectric layer 75. Metal layer 85 comprises a metal material and, in a preferred embodiment, is deposited in a gradient manner so as to be thicker at the top of lens 400 than at the bottom of lens 400. Third dielectric layer 95 is then deposited in a gradient manner over an entire outer surface of metal layer 85. Third dielectric layer 95 comprises a high or low index dielectric material and, in a preferred embodiment, is deposited in a gradient manner so as to be thicker at the top of lens 400 (and at the top of metal layer 85) than at the bottom of lens 400 (and at the bottom of metal layer 85). As one of skill in the art will recognize after reading and understanding the present invention, such a lens provides a dual chromatic effect when viewed from the side opposed to the eyes of a wearer, and, in particular, provides for a lens having two zones with differently colored reflection, one of which is gradient in nature.

With regard to substrates 10, 15, 50 and 55, the preferred material is any optical material for lenses, including but not limited to glass, plastic, CR39, polyamides, polycarbonate, polymethyl methacrylate, polyurethane, cellulosic polymers, and substrates of the same materials but incorporating a polarizing film into the body of the substrate or adherent to its surface. The thickness of the substrate is not critical to the operation of the lens, but is merely a matter of design choice to one of skill in the art. By way of a non-limiting example, if the substrate is CR-39, then substrate 10 can be 1 to 4 mm thick, and is preferably 1.4 mm to 3 mm thick, and most preferably is 2 mm thick.

With regard to metal layers 25, 60, 65, 80 and 85, any metallic light absorbing material commonly used in the field can be used as the metallic material including, but not limited to, silver, chromium, aluminum, gold, nickel, germanium and the like. In fact, all the metals cited into the CERAC catalog of evaporation materials are suitable for use as the metallic material in the metal layers of the present invention. The materials used in any of the metal layers can be the same or different materials than those used in any other metal layer of the same lens. Chromium and aluminum are the presently preferred materials for use in the metal layers. The thickness of metal layers is not critical to the operation of the present invention, but rather the metal layers can be deposited at a thickness sufficiently thin so as to be transparent. By way of a non-limiting example, if chromium is used as the metallic material then the thickness of the metal layers deposited on the substrate surface can range from 50 to 300 angstroms.

With regard to the materials of the dielectric layers 20, 30, 35, 40, 45, 65, 70, 75, 90 and 95, each of these materials can be the same or different materials. The preferred dielectric materials are generally SiO or $SiO_2$, but other dielectric materials can be used, including, but not limited to, $TiO_2$, $Cr_2O_3$ and the like. The preferred low index dielectric materials are SiO or $SiO_2$ and the preferred high index dielectric material is $Cr_2O_3$. The thickness of the uniformly applied dielectric layers 30, 35, 65, 70 and 75, is not critical to the operation of the present invention, but rather is a function of the desired color of the reflection to be achieved. For example, by increasing the deposition thickness of SiO on a mirror-coated CR39 substrate, one can obtain at first a gold reflection, then a brownish reflection, then a violet reflection, and then a blue reflection, all without changing the transmission of the lens. By way of non-limiting examples, the following identifies the relationship between thickness of SiO layer deposited and reflection color obtained:

| | |
|---|---|
| 300 angstrom | Yellow |
| 550 angstrom | Violet |
| 750 angstrom | Blue |

Deposition of $SiO_2$ is similar but the reflection colors are somewhat weaker.

With regard to gradiently applied dielectric layers 40, 45, 90 and 95, the principle is the same as detailed above with respect to the uniformly applied dielectric layers. By way of a non-limiting example, with regard to FIG. 2, one can deposit a first dielectric layer 35 of SiO at a thickness to obtain a violet color reflection. The lower part of the lens can then be masked, and the deposition of SiO continues to form second dielectric layer 45 on the upper part of the lens, thereby achieving a blue reflection on the upper part of the lens that includes second dielectric layer 45 while maintaining the violet color on the lower part of the lens which does not include second dielectric layer 45.

With regard to the materials of high index dielectric layers 20 and 65, the preferred high index dielectric material is $Cr_2O_3$, but, as one of skill in the art will recognize after considering the present invention, other high index dielectric materials can be used as a matter of design choice without departing from the spirit of the invention. The thickness of the uniformly applied high index dielectric layers 20 and 65 are not critical to the operation of the present invention, but rather are a function of the desired color of the reflection to be achieved.

As one of skill in the art will recognize, additional layers can be added to the lenses of the present invention without departing from the spirit of the invention. Further, while FIGS. 1 through 4 of the present invention depict the gradient layers ending approximately half way down the lens, the exact starting and ending points of the gradient layers is not critical to the operation of the present invention, and is merely shown as starting at the top and ending half way down for illustrative purposes only. Such gradient layers could also extend from a side-to-side fashion on the lens.

As one of skill in the art will recognize, the present invention provide lenses with at least two zones with differently colored reflection if one observes the lens from the side opposed to the eyes of wearer, while at the same time providing a lens which is uniformly transparent if observed from the wearer even if the mirror coated side has two differently tinted reflection areas. The present invention also provides a lens with a gradient mirrored zone on another colored mirrored area.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between. In particular, this invention should not be construed as being limited to the dimensions, proportions or arrangements disclosed herein.

What is claimed is:

1. A lens comprising:
   a substrate;
   a first metal layer comprising a first metal material uniformly covering an outer surface of said substrate;
   a first dielectric layer comprising a first dielectric material uniformly covering said first metal layer;
   a second metal layer comprising a second metal material gradiently covering only a portion of said first dielectric layer; and
   a second dielectric layer formed of a second dielectric material gradiently covering said second metal layer.

2. The lens according to claim 1, wherein said first metal material and said second metal material are the same or different materials.

3. The lens according to claim 1, wherein said first dielectric material and said second dielectric material are the same or different materials.

4. The lens according to claim 1, wherein said first and second metal materials comprises an element selected from the group consisting of silver, chromium, aluminum, gold, nickel and germanium, and wherein said first and second dielectric materials comprises a material selected from the group consisting of $SiO$, $SiO_2$, $TiO_2$, and $Crhd O_3$.

5. A lens adapted to be worn by a wearer, said lens comprising:
   a substrate having an inner surface and an outer surface;
   at least one metal layer deposited in a gradient thickness either directly or indirectly over said outer surface of said substrate; and
   at least one dielectric layer deposited in a gradient thickness either directly or indirectly over said outer surface of said substrate;
   wherein neither said metal layer nor said dielectric layer cover said entire outer surface of said substrate when observed from the side of the lens opposed to the eyes of the wearer.

6. A method of manufacturing a lens having a chromatic effect comprising the steps of:
   providing a substrate having an outer surface;
   vacuum depositing a first metal layer at a uniform thickness over said outer surface of said substrate;
   vacuum depositing a first dielectric layer at a uniform thickness over an entire outer surface of said first metal layer;
   masking a portion of an outer surface of said first dielectric layer;
   vacuum depositing a second metal layer at a gradient thickness over an unmasked portion of said first dielectric layer, and
   vacuum depositing a second dielectric layer at a gradient thickness over an entire outer surface said second metal layer.

* * * * *